Figure 1:
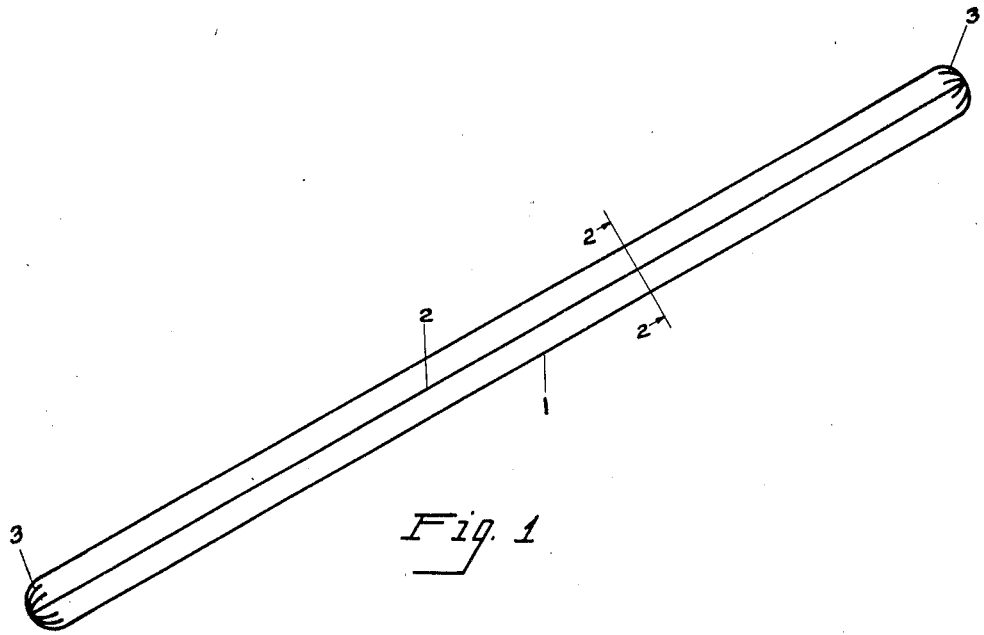

March 12, 1929.  H. W. KNOTT  1,704,978
WELDING STICK
Filed Dec. 6, 1920

Henderson W. Knott
BY B. D. Watts
HIS ATTORNEY

Patented Mar. 12, 1929.

1,704,978

UNITED STATES PATENT OFFICE.

HENDERSON W. KNOTT, OF CLEVELAND, OHIO, ASSIGNOR TO RAIL WELDING AND BONDING COMPANY, OF CLEVELAND, OHIO, A CORPORATION OF DELAWARE.

WELDING STICK.

Application filed December 6, 1920. Serial No. 428,573.

The invention relates in general to a welding stick or material supplying cartridge for use in the process of welding metals or of depositing metals by fusion, and this definition is sufficiently inclusive to cover welding electrodes for supplying material as well as act as an electric conductor in the art of electric welding.

It has been known in the prior art of electric welding to form the metallic electrode with a coating of some substance such as sodium silicate and calcium carbonate, which when gasified have the function of protecting the weld from the surrounding air. Such an article was objectionable in that the coating was fragile, readily chipped off and when covered with an additional protecting coating an unnecessary expense was incurred and incidentally a bulky and cumbersome article was formed which could be used only with difficulty in confined places.

Accordingly, the primary object of the invention is to provide a simplified form of material feeding cartridge of the type above outlined, which can be carried about without danger of disintegrating and which, when fed to the welding crater, can supply the requisite ratio of metal to gas forming substance so as to protect the welded surface from the oxidation while feeding the metal to the weld.

The improved article in one commercially acceptable shape is shown in the drawing and is formed of any convenient length and is about the size of an ordinary lead pencil. This stick includes in general an outer cylindrical metallic shell, one form of which is made of thin sheet iron 1, rolled to bring its edges together as at 2 and having its ends slitted as at 3 and folded together to form a container capable of retaining a loose powdered substance, such as sodium bicarbonate. The metal shell encloses a core 4 of the gas producing substance and the proportion of metal to substance is present to supply the demands which the particular stick is intended to meet. One highly satisfactory and inexpensive substance suggested for this use is sodium bicarbonate.

In operation, a stick of the metal jacketed article is fed to the crater of the weld, or, in the case of an electric weld, may constitute one of the electrodes. The fusion temperature present is greater than the melting point of the metal which temperature acts on the thin metallic shell to cause the same to progressively chip or melt off and expose the powdered gas producing substance to the action of the intense heat present. The bicarbonate of soda herein suggested decomposes under the intense heat without the formation of substantially any slag into a heavy gas blanket of carbon dioxide which settles downwardly through the crater and thus protects the welded surfaces from any oxidizing action which would otherwise take place.

Figure 2:
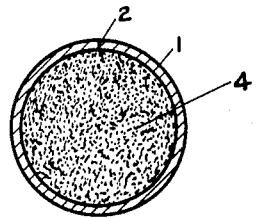

In the accompanying drawing which forms a part of this specification:

Figures 1 and 2 are respectively perspective and cross sectional views of one form of device embodying my invention.

As the metallic shell is of relatively small gauge of metal, it can be quickly heated to its melting temperature and at the same time can be supplied in any desired amounts required by the welding process. Usually a proportionately smaller amount of gas producing substance is desired than metal and therefore the powdered gas producing substance is disposed as the core rather than the outer layer of the stick. The metallic shell is of sufficient rigidity to hold the powdered substance in place and there is therefore no necessity of utilizing any additional member or substance for binding, retaining or protecting the powdered substance. As all of the gas producing substance is retained in the welding stick or cartridge up to the point where it is utilized, the stick can be accurately formed so as to provide a definite ratio of metal to produced gas and in this way an accurate control is provided simply by selecting the proper size of gage to be used in the shell compared to the volume of the substance per unit of length.

Having thus described my invention, I claim:

1. A welding stick for use in electric arc welding comprising ferrous sheet metal shaped to form a hollow cylindrical shell enclosing a cavity relatively large in cross-sectional area with respect to the cross-sectional area of said ferrous metal, loose pulverulent flexing material adapted to produce a non-oxidizing atmosphere during the welding operation disposed within the cavity formed by said shell, said shell being closed at its ends to maintain said fluxing material therein until said welding stick is employed in a welding operation.

2. A welding stick for use in electric arc welding comprising sheet iron shaped to form a hollow cylindrical shell enclosing a cavity relatively large in cross-sectional area with respect to the cross-sectional area of said sheet iron, loose pulverulent fluxing material comprising sodium bicarbonate disposed within the cavity formed by said shell, the metal of the ends of said shell being closed to maintain said fluxing material in the welding stick until said stick is employed in a welding operation.

Signed at New York, in the county of New York and State of New York this 17th day of Nov., A. D. 1920.

HENDERSON W. KNOTT.